T. J. BRYSON.
TRACTION LUG FOR VEHICLES.
APPLICATION FILED AUG. 14, 1919.
1,349,406. Patented Aug. 10, 1920.
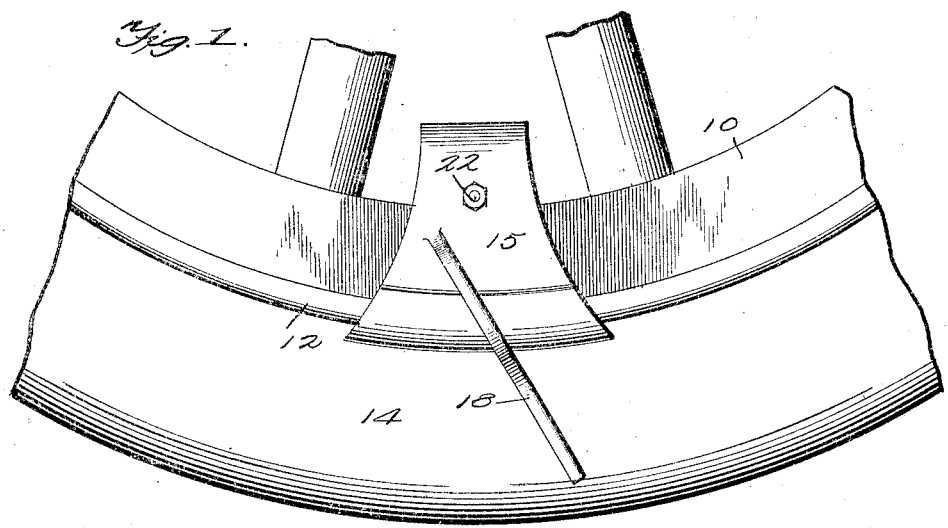
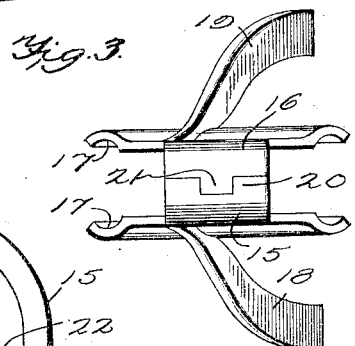
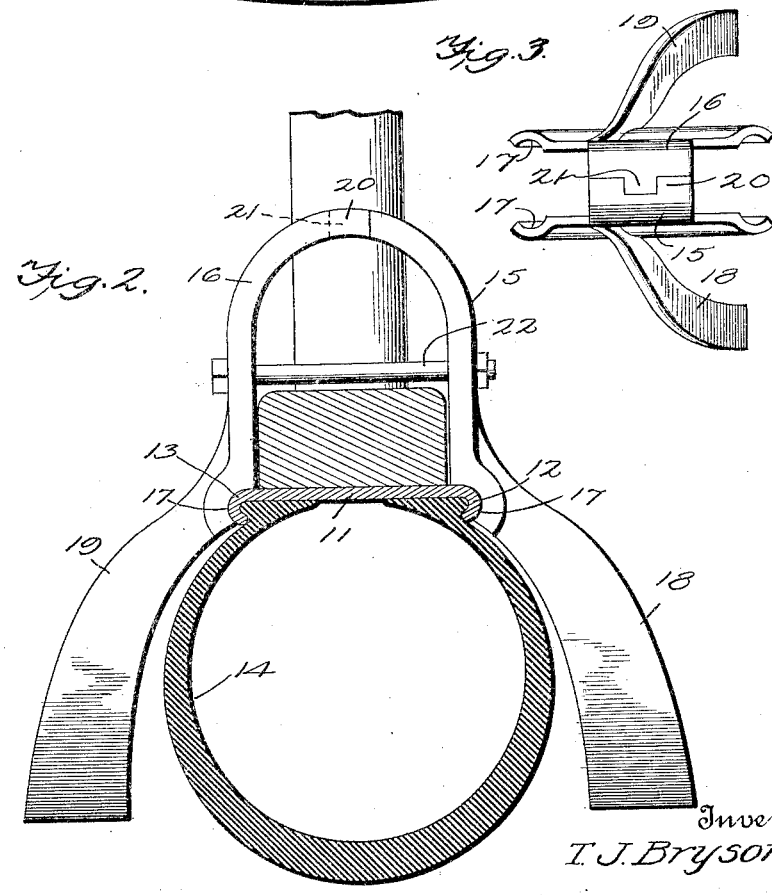
Inventor
T. J. Bryson

UNITED STATES PATENT OFFICE.

THOMAS J. BRYSON, OF NEW ORLEANS, LOUISIANA.

TRACTION-LUG FOR VEHICLES.

1,349,406.

Specification of Letters Patent. Patented Aug. 10, 1920.

Application filed August 14, 1919. Serial No. 317,489.

*To all whom it may concern:*

Be it known that I, THOMAS J. BRYSON, a citizen of the United States, residing at New Orleans, in the parish of Orleans and State of Louisiana, have invented certain new and useful Improvements in Traction-Lugs for Vehicles, of which the following is a specification.

This invention relates to new and useful improvements in tractor attachments for the drive wheels of self-propelled vehicles, and more particularly to that type of tractor attachment commonly known as a mud hook.

An important object of the invention is to provide a device of this character which will not mar the felly or spokes of the wheel.

A further object of the invention is to provide such a device which is normally held out of contact with the ground and which, in event the wheel sinking in soft ground immediately grips the surface.

Other objects and advantages of the invention will be apparent during the course of the following description.

In the accompanying drawings forming a part of this specification and in which like numerals are employed to designate like parts throughout the same, Figure 1 is a fragmentary side elevation showing my hook attached to the drive wheel of an automobile, Fig. 2 is a section taken through the felly and rim of the wheel showing my hook in side elevation, and, Fig. 3 is a plan view of the hook.

Referring now more particularly to the drawings, the numeral 10 indicates the felly of a wheel to which is secured the usual demountable rim 11, providing grooved flanges 12 and 13 to receive the beads of a tire 14. Plates 15 and 16 are provided, each of the plates being provided with a recess 17 adapted to receive the grooved flanges 12 and 13 of the rim 11. By referring to Fig. 1, it will be seen that the plates 15 and 16 have somewhat the form of a truncated triangle, the recesses 17 being formed in the base of the triangle.

Plates 15 and 16 are provided with depending mud hooks 18 and 19. As will be clearly seen by referring to Fig. 1, these hooks are inclined in the direction of rotation. The upper end of the plate 15 is provided with a recess 20 adapted to receive an enlargement 21 formed upon the plate 16.

The plates 15 and 16 are arranged upon opposite sides of the felly so that the recesses thereof receive the grooved flanges 12 and 13 of the rim 11. A bolt 22 is now passed through the plates and tightened. As will be clearly seen by referring to Fig. 2, a binding action results by means of which the recesses 17 are brought into firm engagement with the grooved flanges and as these recesses are sufficiently undercut to receive a large portion of these flanges, vertical displacement of the plates and hooks is prevented thereby.

It will be readily seen that the plates 15 and 16 in no way contact the felly or spokes of the wheel, the entire gripping action being exerted upon the rim 11, which in the usual construction is formed of metal. Should the tire 14 become deflated because of a leaky valve, puncture or the like, the hooks 18 and 19 contacting with the road bed would advise the driver of the fact. The hooks 18 and 19 being normally out of contact with the road consequently receive little wear and will out-last any type of tractor attachment which is continually in contact with the road.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a traction lug for drive wheels having an outstanding rim, a pair of plates adapted to be arranged upon opposite sides of the wheel, each of said plates being provided with a recess adapted to receive said rim, traction lugs secured to each of said plates, and means for securing said plates upon said rim.

2. In a traction lug for drive wheels having an outstanding rim, a pair of plates having engaging faces at their upper ends adapted to be arranged upon opposite sides of the wheel, each of said plates being provided with a recess adapted to receive said rim, traction lugs secured to said plate, and means for securing said plates upon said rim comprising, a bolt connecting said plates intermediate said engaging faces and said recesses.

3. In a traction lug for drive wheels having an outstanding rim, provided upon its sides with curved flanges adapted to receive the beads of a tire, a pair of plates adapted to be arranged upon the opposite sides of said wheel, each of said plates being provided with a recess adapted to receive said rim flanges, traction lugs secured to said plates, and means for securing said plates upon said rim.

4. In a traction lug for drive wheels having an outstanding rim provided upon its sides with curved flanges adapted to receive the beads of a tire, a pair of plates having engaging faces adapted to be arranged upon opposite sides of the wheel, each of said plates being provided with an under-cut recess adapted to receive said flanges, traction lugs secured to each of said plates, and means for securing said plates upon said flanges comprising a bolt connecting said plates intermediate said engaging faces and said recesses.

In testimony whereof I affix my signature in presence of two witnesses.

THOMAS J. BRYSON.

Witnesses:
HEYMAN ISAACS,
MERIWETHER LEWIS.